(12) United States Patent
Evans et al.

(10) Patent No.: US 8,456,644 B2
(45) Date of Patent: Jun. 4, 2013

(54) MEASUREMENT OF CHANGES IN SURFACES OF OBJECTS

(75) Inventors: Christopher J. Evans, Concord, NC (US); John Filhaber, East Haddam, CT (US); Vivek G. Badami, Higganum, CT (US); Jan Liesener, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 398 days.

(21) Appl. No.: 12/874,570

(22) Filed: Sep. 2, 2010

(65) Prior Publication Data

US 2011/0051147 A1 Mar. 3, 2011

Related U.S. Application Data

(60) Provisional application No. 61/239,782, filed on Sep. 3, 2009.

(51) Int. Cl.
*G01B 11/02* (2006.01)

(52) U.S. Cl.
USPC .......................................................... 356/513

(58) Field of Classification Search
USPC .......................................................... 356/513
See application file for complete search history.

(56) References Cited

U.S. PATENT DOCUMENTS

| | | | | |
|---|---|---|---|---|
| 5,218,423 A | * | 6/1993 | Kishner | 356/513 |
| 5,220,406 A | * | 6/1993 | Kishner | 356/513 |
| 5,467,191 A | * | 11/1995 | Kishner | 356/513 |
| 6,816,267 B2 | | 11/2004 | Evans et al. | 356/515 |

OTHER PUBLICATIONS

Pan et al., "Efficient testing of segmented aspherical mirrors by use of reference plate and computer-generated holograms. I. Theory and system optimization", Applied Optics, vol. 43, No. 28, pp. 5303-5312, Oct. 1, 2004.
Pan et al., "Efficient testing of segmented aspherical mirrors by use of a reference plate and computer-generated holograms. II. Case study, error analysis, and experimental validation", Applied Optics, vol. 43, No. 28, pp. 5313-5322, Oct. 1, 2004and Burge, Applied Optics, vol. 43, No. 28, pp. 5303-5322, Oct. 1, 2004.

* cited by examiner

*Primary Examiner* — Tarifur Chowdhury
*Assistant Examiner* — Jonathon Cook
(74) *Attorney, Agent, or Firm* — Fish & Richardson P.C.

(57) ABSTRACT

Deformations of a surface of a test object can be measured by attaching mirrors to a surface of a test object, each mirror having a reflective surface with a dimension and a radius of curvature smaller than those of the surface of the test object. Light is directed towards the mirrors and a reference surface, and interference patterns are generated using light reflected from the mirrors and the reference surface. Changes in the surface of the test object are determined based on the interference patterns.

40 Claims, 5 Drawing Sheets wavelength = $\lambda/2$ wavelength = $\lambda$

MEASUREMENT OF CHANGES IN SURFACES OF OBJECTS

CROSS REFERENCE TO RELATED APPLICATIONS

This application claims priority to U.S. Provisional Application No. 61/239,782, filed on Sep. 3, 2009. The application is incorporated by reference in its entirety.

TECHNICAL FIELD

This invention relates to measurement of changes in surfaces of objects.

BACKGROUND

Referring to FIG. 1, segments for the primary mirror of the next generation of large ground based telescopes (such as the Thirty Meter Telescope) are currently designed as approximate hexagonal shapes close to 1.44 meter corner to corner and approximately 45 mm thick, with aspheric surface shapes. They are supported on a multi-point mount to minimize gravity induced deformations.

In use, the primary mirror may be tilted between zenith (i.e., pointing straight up) to approximately 80 degrees from vertical. The element mount design is configured to minimize the change in shape of the optical surface. For example, FIG. 2 shows the predicted shape change of an element of the Thirty Meter Telescope primary mirror when the pointing direction changes 80 degrees. There is an active bender designed into the system. The response of the mirror to forces applied by the bender can be predicted. Validation of the mount design and the predicted behavior of the bender may require surface figure measurement with less than, e.g., 15 nm root-mean-square (rms) uncertainty.

The surface profiles of the mirrors can be measured using a large test tower having a reference optic having a reference surface with a size that corresponds to the size of the surface of the part being tested. Measuring deformations with change in the gravity vector may involve, e.g., changing the orientations of the reference optic and the part under test.

SUMMARY

In one aspect, in general, a number of small reflectors are attached to the surface of interest to synthesize a segmented surface with a higher numerical aperture (or lower f/no) that can be tested with a single instrument that measures the change in slope of the individual sub-apertures as the assembly is tilted. The change in slope may be integrated to give a change in figure. A compact, low cost test method is provided to evaluate changes in the shape of the surface of an optical element with changing orientation. The method may also be used to evaluate changes in mirror figure with temperature or bending due to residual stress when mirrors are cut from circular to hexagonal (or other) shapes.

In another aspect, in general, a method of measuring deformations of a surface of a test object is provided. The method includes attaching mirrors to a surface of a test object, each mirror having a reflective surface with a dimension and a radius of curvature smaller than those of the surface of the test object; directing light towards the mirrors and a reference surface; generating interference patterns using light reflected from the mirrors and the reference surface; and determining changes in the surface of the test object based on the interference patterns.

Implementations of the method can include one or more of the following features. The method can include estimating deformations of the test object, and determining locations for placement of the mirrors based on the estimated deformations. The method can include placing the mirrors at locations where there are estimated changes in the slope of the surface of the test object. The mirrors can be placed at locations of maximum estimated slope change. Finite element analysis can be used to estimate the deformations due to gravity in response to a change in an orientation of the test object. Changes in the surface of the test object in response to changes in one or more conditions associated with the test object can be determined. The one or more conditions can include at least one of an orientation of the test object or a temperature of the test object. In some examples, generating the interference patterns can include using light reflected from all the mirrors simultaneously to generate the interference patterns. In some examples, generating the interference patterns can include sequentially detecting light reflected from various mirrors to generate the interference patterns. The method can include determining a first radius of curvature for the surface of a first mirror, and determining a second radius of curvature for the surface of a second mirror based on the first radius of curvature and an offset. The method can include determining the offset based on a distance between the first and second mirrors and a radius of curvature of the surface of the test object. The first radius of curvature can be determined based on a size of the surface of the test object and a numerical aperture of an optical system that directs light toward the mirrors. The test object can have a parabolic surface, and the method can include determining a first radius of curvature for the surface of a first mirror positioned at or near an optical axis of the test object, and determining a second radius of curvature for the surface of a second mirror based on the first radius of curvature and an offset, the offset being determined using parabolic approximation. The test object can include a piece of glass and a mount for supporting the glass. The test object can include a primary mirror segment of a telescope. The surface of the test object can be reflective.

In another aspect, in general, a method of measuring a surface of a test object is provided. The method includes attaching mirrors to a surface of a test object, each mirror having a reflective surface with a dimension and a radius of curvature smaller than those of the surface of the test object; and determining changes in the surface of the test object using light reflected from the mirrors.

Implementations of the method can include one or more of the following features. Changes in the surface of the test object in response to changes in one or more conditions associated with the test object can be determined. The one or more conditions can include at least one of an orientation of the test object or a temperature of the test object. Changes in the surface of the test object can be determined based on interference patterns generated from light reflected from the mirrors and light reflected from a reference surface. The surface of the test object can be reflective.

In another aspect, in general, a method of measuring a primary mirror segment of a telescope is provided. The method includes attaching small mirrors to a surface of a primary mirror segment of a telescope, each small mirror having a reflective surface having a dimension and a radius of curvature smaller than those of the surface of the primary mirror segment; positioning the primary mirror segment at a first orientation and generating a first interference pattern based on light reflected from the small mirrors; positioning the primary mirror segment at a second orientation and generating a second interference pattern based on light reflected from the small mirrors; and measuring changes in the surface of the primary mirror segment based on the first and second interference patterns.

Implementations of the method can include one or more of the following features. When the primary mirror segment is in the first orientation, the optical axis of the primary mirror segment can be substantially aligned with a vertical direction, and when the primary mirror segment is in the second orientation, the optical axis of the primary mirror segment can be at an angle with respect to the vertical direction. The surface of the primary mirror segment can have a radius of curvature greater than ten times that of the small mirrors.

In another aspect, in general, a system for measuring a surface of a test object is provided. The system includes mirrors attached to a surface of a test object, each mirror having a reflective surface having a dimension and a radius of curvature smaller than those of the surface of the test object; optics to direct light toward a reference surface and the mirrors; and an interferometer to detect interference patterns generated based on light reflected from the reference surface and light reflected from the mirrors.

Implementations of the system may include one or more of the following features. The system can include a data processor to determine changes in the surface of the test object based on the interference patterns. The mirrors can be placed at locations of the surface of the test object, the locations being determined based on estimated changes in the surface of the test object in response to a change in one or more conditions associated with the test object. The mirrors can be placed at locations where the estimates indicate changes in the slope of the surface of the test object. The mirrors can be placed at locations of maximum estimated slope change. At least two mirrors can have different radius of curvatures. One of the mirrors can have a radius of curvature determined based on a size of the surface of the test object and a numerical aperture of an optical system that directs light towards the mirrors. The test object can have a parabolic surface, a first mirror can having a first radius of curvature can be positioned at or near an optical axis of the test object, and a second mirror can have a second radius of curvature determined based on the first radius of curvature and an offset, the offset being determined using parabolic approximation. The surface of the test object can be reflective.

In another aspect, in general, a system for measuring a surface of a primary mirror segment of a telescope is provided. The system includes small mirrors attached to a surface of a primary mirror segment of a telescope, each small mirror having a reflective surface having a dimension and a radius of curvature smaller than those of the surface of the primary mirror segment; and an interferometer to detect interference patterns generated based on light reflected from a reference surface and light reflected from the mirrors.

Implementations of the method can include one or more of the following features. The system can include a data processor to determine deformations of the primary mirror segment based on the interference patterns. The system can include optics to convert collimated waves from the interferometer to converging waves that, after passing a focal point, are direct toward the mirrors. The optics to convert the collimated waves can include a transmission sphere. The optics has a numerical aperture, and the radius of curvature of each of the mirrors can be determined based on the numerical aperture. The primary mirror segment can be supported by a mount, and changes in the surface of the primary mirror segment can be caused by changes in a shape of the primary mirror segment, changes in the mount, or changes in a coupling between the primary mirror segment and the mount.

In another aspect, in general, a method of measuring a surface of a test object is provided, the method includes attaching a first mirror to a surface of a test object, the first mirror having a reflective surface with a dimension that is smaller than that of the surface of the test object, the first mirror having a radius of curvature smaller than that of the surface of the test object; and detecting changes in a shape of the test object when the test object changes from a first orientation to a second orientation, the detecting being based on a first interference pattern and a second interference pattern, the first interference pattern being generated partly from light reflected from the first mirror when the test object is at the first orientation, the second interference pattern being generated partly from light reflected from the first mirror when the test object is at the second orientation.

Implementations of the method can include one or more of the following features. The method can include reflecting a first portion of light emitted by a light source from a reference surface, reflecting a second portion of the light from the first mirror, and generating the first or second interference pattern based on an interference between the first portion of the light reflected from the reference surface and the second portion of the light reflected from the first mirror. The method can include using a detector to detect the first and second interference patterns, the detector being placed at an effective distance to the surface of the test object, the effective distance being smaller than the radius of curvature of the surface of the test object. The method can include placing a detector at an effective distance to the surface of the test object to detect the first and second interference patterns, the effective distance being smaller than half the radius of curvature of the surface of the test object. The radius of curvature of the first mirror can be less than half the radius of curvature of the surface of the test object. The radius of curvature of the first mirror can be less than 10% of the radius of curvature of the surface of the test object. The method can include attaching a second mirror to the surface of the test object, the second mirror being spaced apart from the first mirror, the second mirror having a reflective surface with a dimension that is smaller than that of the surface of the test object, the second mirror having a radius of curvature smaller than that of the surface of the test object. The first interference pattern can be generated partly from light simultaneously reflected from the first and second mirrors. The test object can include a piece of glass and a mount for supporting the glass. The surface of the test object can be reflective.

In another aspect, in general, a method of measuring deformations of a surface of a test object is provided. The method includes attaching reflective devices to a curved surface of a test object, each reflective device having a reflective region having an area smaller than the area of the surface of the test object; directing light towards the reflective devices and a reference surface; reflecting at least portions of the light from the reflective devices such that the reflected light substantially converge toward a focus point, the distance between the focus point and the surface of the test object being smaller than a radius of curvature of the test object; generating interference patterns using light reflected from the reflective devices and light reflected from the reference surface; and determining changes in the surface of the test object based on the interference patterns.

Implementations of the method can include one or more of the following features. The reflective devices can include a flat mirror, a concave mirror, linear gratings, or a reflection hologram having diffraction gratings. The method can include estimating deformations of the test object, and determining locations for placement of the reflective devices based on the estimated deformations. The method can include placing the reflective devices at locations where there are maximum estimated changes in the slope of the surface of the test object. The test object can include a primary mirror segment of a telescope. The reflective devices can include reflection holograms having diffraction gratings, and the method can include using interference lithography to fabricate the diffraction gratings.

In another aspect, in general, a system for measuring a surface of a test object is provided. The system includes reflective devices attached to a surface of a test object, each reflective device having a reflective region having an area smaller than the area of the surface of the test object; optics to direct light toward a reference surface and the reflective devices, the reflective devices being configured to reflect at least portions of the light such that the reflected light substantially converge toward a focus point, the distance between the focus point and the surface of the test object being smaller than a radius of curvature of the test object; and an interferometer to detect interference patterns generated based on light reflected from the reference surface and light reflected from the reflective devices.

Implementations of the system may include one or more of the following features. The system can include a data processor to determine changes in the surface of the test object based on the interference patterns. The reflective devices can include a flat mirror, a concave mirror, linear gratings, or a reflection hologram having diffraction gratings. The reflective devices can be placed at locations of the surface of the test object in which the locations are determined based on estimated changes in the surface of the test object in response to a change in one or more conditions associated with the test object. The reflective devices can be placed at locations where the estimates indicate changes in the slope of the surface of the test object. The reflective devices can be placed at locations of maximum estimated slope change. The surface of the test object can be reflective.

Although described herein as an interferometer for testing aspherical mirror surfaces, the same concepts may be generalized for the measurement of any surface shape, with appropriate changes in the reference element.

DESCRIPTION OF DRAWINGS

Like reference symbols in the various drawings indicate like elements.

DETAILED DESCRIPTION

Figure 1:
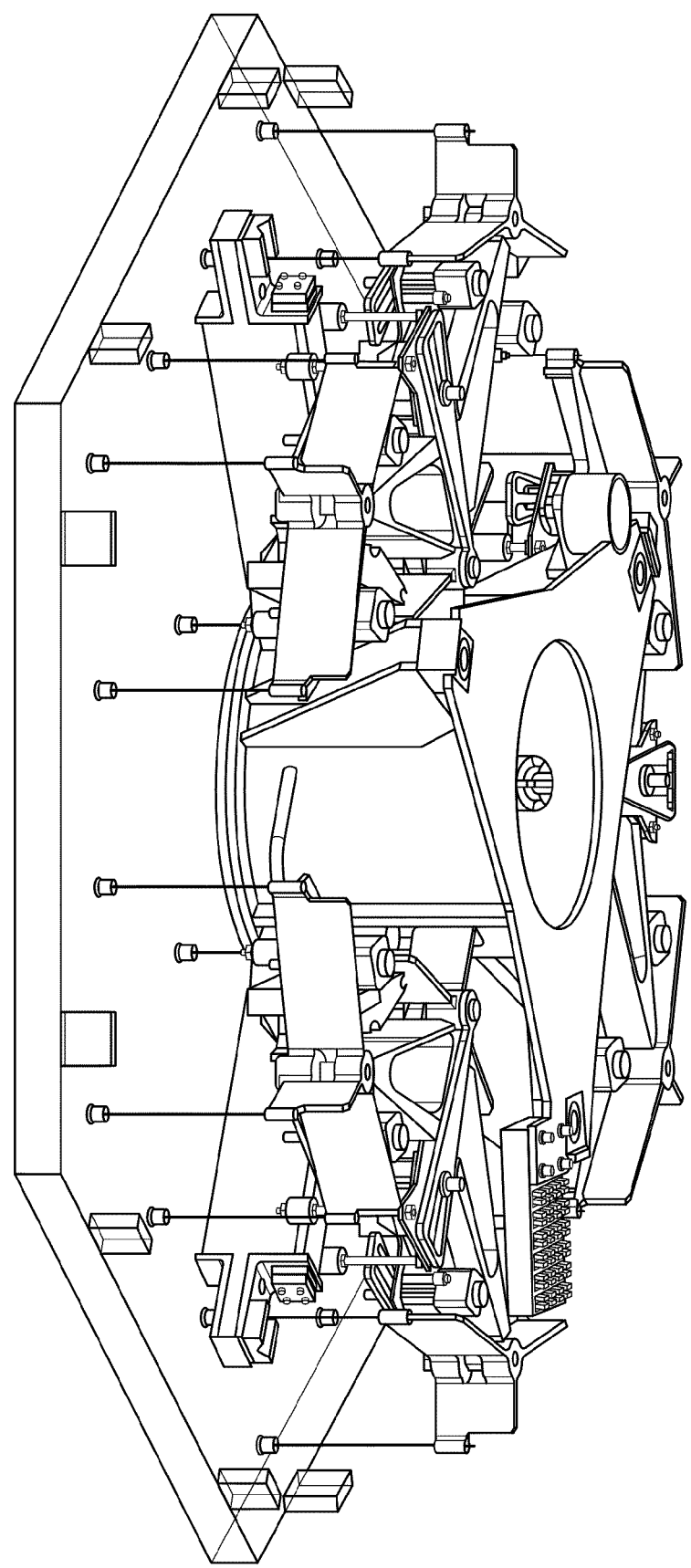
FIG. 1 is a diagram of an example mounted mirror segment of a large telescope.
Figure 2:
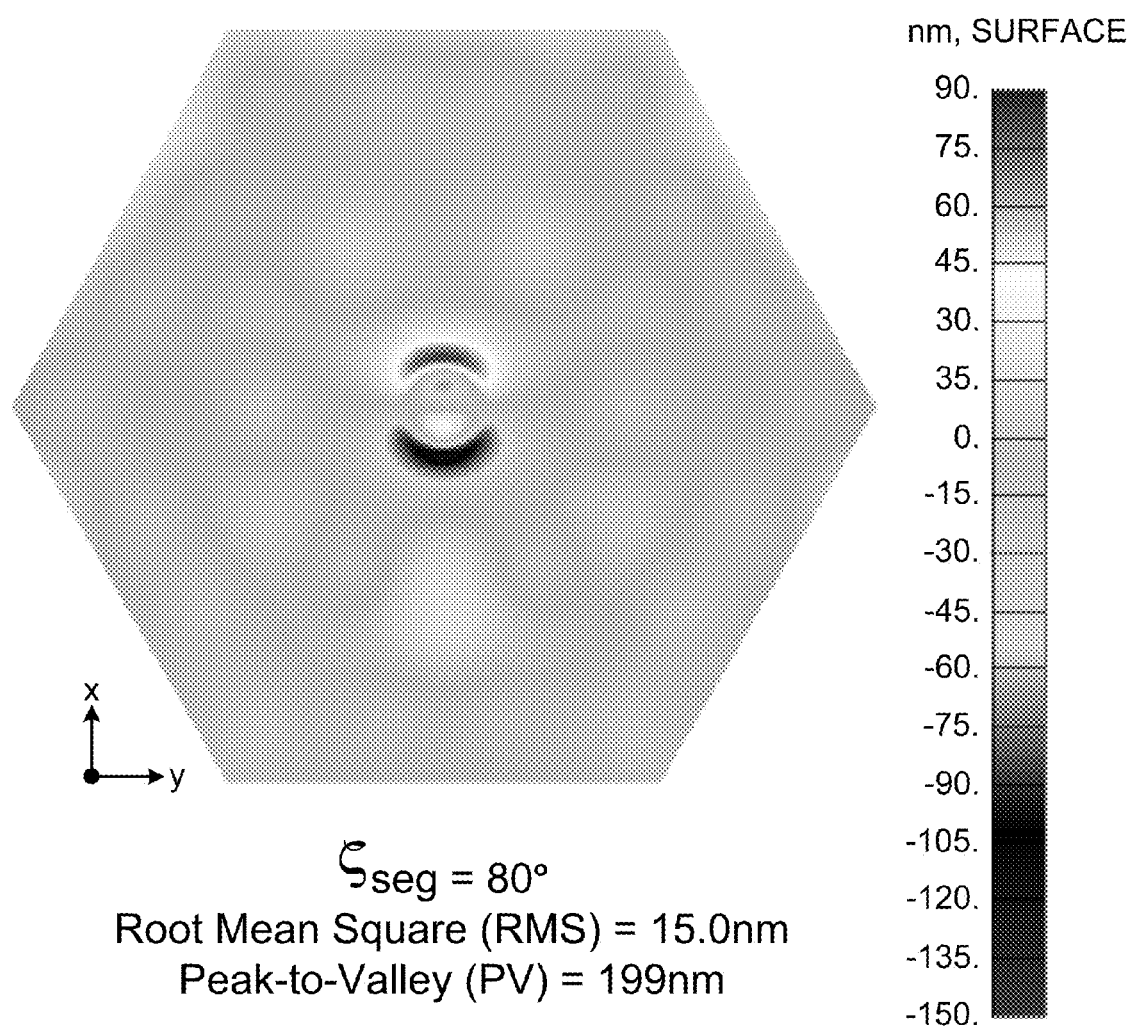
FIG. 2 is a graph showing example changes in a mirror segment when the orientation of the segment changes 80 degree from zenith.
Figure 3:
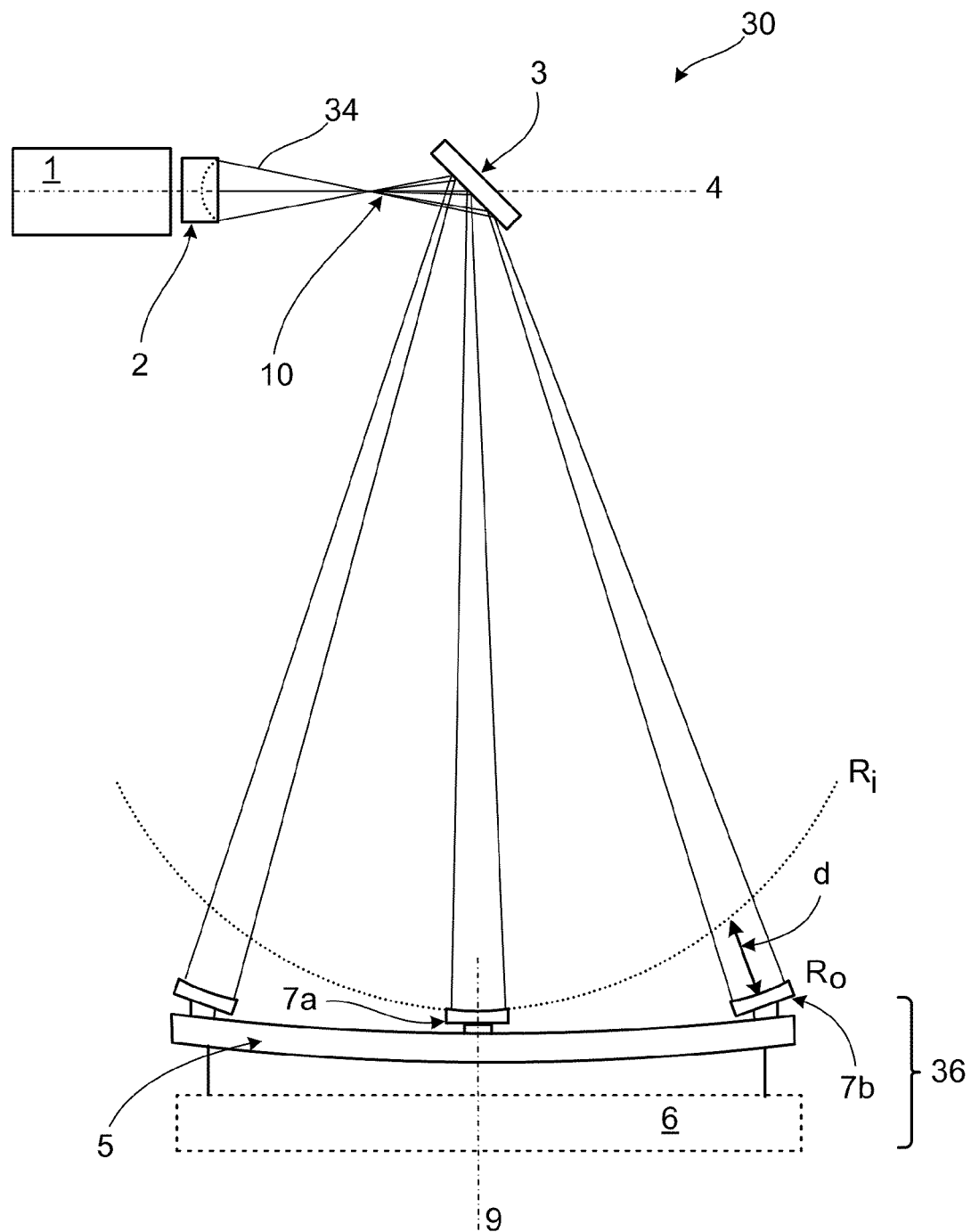
FIG. 3 is a diagram of an example setup for testing a mirror segment.

Referring to FIG. 3, a measurement system 30 for measuring a surface 32 of a test object 5 includes an interferometer 1 that emits a collimated wavefront that is converted by an optical system, such as a transmission sphere 2, to a spherical, converging wavefront 34. The interferometer 1 can be, e.g., a Fizeau interferometer. For example, the test object 5 can be a primary mirror segment of a telescope, and can have an approximate hexagonal shape, a corner-to-corner dimension of approximately 1.44 meter, and an approximate thickness of 45 mm. The surface 32 can be an aspheric surface. The transmission sphere 2 includes optics designed such that a portion (e.g., 4%) of the light is reflected from a reference surface of the transmission sphere 2 and focused onto a detector of the interferometer 1. The remaining light is directed towards a fold mirror 3 and reflected from the fold mirror 3 to a test system 36 being measured. The test system 36 includes the test object 5 and a supporting mount 6.

Signals from the interferometer 1 are sent to a computer (not shown) to process interference patterns detected by the interferometer 1. The computer can analyze changes in the interference patterns as the test object 5 is adjusted to various orientations. For example, the computer can analyze the deformation of the test object 5 due to gravity as the orientation of the test object 5 changes.

A number of small, light-weight spherical mirrors, e.g., 7a and 7b (collectively referenced as 7), are attached to the surface 32 of the test object 5. The mirrors 7 have a radius of curvature selected to match the interferometer wavefront at their respective locations. Each of the mirrors 7 reflects light back to the detector in the interferometer 1 via the fold mirror 3 where the light reflected from the mirrors 7 interferes with the light reflected from the reference surface of the transmission sphere 2. Various techniques in interferometry, such as phase shifting or wavelength shifting, can be used to convert the resulting intensity profile into a height map of the surface of the test object 5.

In some examples, the mirror 7a is placed at or near an axis 9 of the test object 5. For example, if the numerical aperture of the transmission sphere 2 is selected to be f/1.5, then the distance from a focus 10 of the transmission sphere 2 to the surface 32 of the test object 5 is selected to be 2.16 m in order to cover the surface 32 that spans 1.44 m corner to corner. For example, if the distance z (see FIG. 4A) between the vertex P1 of the spherical reflective surface 40 of the mirror 7a and the surface 32 of the test object 5 is 0.03 m, then the radius of curvature 26 of the reflective surface of the mirror 7a is 2.16−0.03=2.13 m.

In some examples, the mirror 7b is placed near an edge of the test object 5, e.g., with its vertex 650 mm from the axis of the test object 5. Using the parabolic approximation, the height difference d between the vertex P1 of the mirror 7a close to the axis 7 and a vertex P2 of the mirror 7b is d=(2*distance from vertex of mirror 7b to axis)^2/(8*radius of curvature of surface of test object 5)=1.3^2/(8*60)=0.003521 m. Assuming the same z (the distance between the vertex of the mirror 7 to the surface 32 of the test object 5) for all mirrors 7, then the radius of curvature for the mirror 7b is 2.13+0.003521=2.133521 m. The radius of curvature of other mirrors 7 can be determined in a similar manner for any given mirror position in the aperture, any base radius of curvature for the test object 5, and any given numerical aperture f/number for the transmission sphere 2.

In some implementations, the mirrors 7 are attached to the object 5 with the test object 5 pointing at the zenith, and using the interferometer 1 to optimize the mirror positions. A set of adjustment mechanisms can be used to allow a mirror 7 to be moved parallel to the mirror surface until the interference pattern observed for that mirror has an acceptably small number of fringes. Once the positions for the mirrors are optimized, the mirrors 7 are attached using, e.g., an ultra-violet light setting cement. A variety of other techniques may also be used to temporarily or permanently attach the mirrors 7 to the test object 5 and to provide the necessary adjustments (e.g., flexures).

In some examples, the expected deformations of the test object 5 are calculated using, e.g., finite element analysis. The mirrors 7 are positioned at points of maximum slope change as the element changes from zenith pointing to other orientations.

After the mirrors 7 are attached to the test object 5, an interferogram is recorded at the zenith pointing position and the tilt of each small mirror 7 with respect to the reference wavefront is recorded. Next, the assembly of the test object 5 on its mount 6 is rotated about an axis 4 passing through the focus of the transmission sphere 2 and through the center of the detector in the interferometer 1. The fold mirror 3 is also rotated until the fringe density in each of the sub-apertures defined by the mirrors 7 is minimized.

For each mirror 7, the difference in tilt in both x and y directions between the zenith position and the new test position is recorded. The average tilt value (for all mirrors 7) represents the alignment difference between the two positions. Fold mirror 3 and/or the assembly of the test object 5 on its mount 6 are adjusted to reduce (e.g., minimize) the average tilt of the mirrors 7. The tilt change, after subtraction of the average, for each mirror is the slope change relative to the test object 5 (primary mirror) footprint. Integration of the slopes gives the change in figure. In some examples, the measured slopes can be related to the bending modes of the test object 5 as deduced from the finite element model, and hence the deformations evaluated. In some examples, the deformations can be evaluated by fitting the measured slopes to the x- and y-derivatives of Zernike polynomials.

In some implementations, the tilts of all the mirrors 7 are measured simultaneously. This reduces (e.g., minimizes) errors due to drift.

Figure 4A:
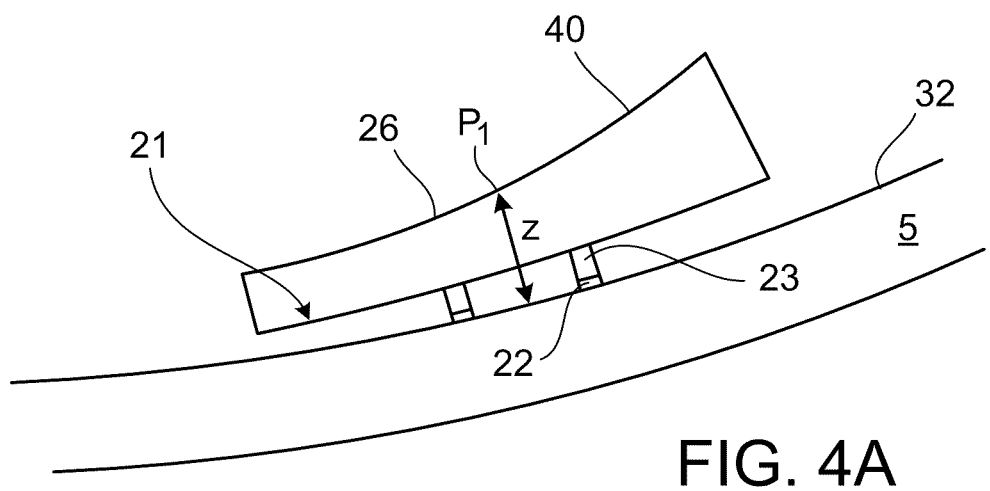
FIGS. 4A and 4B are diagrams of an example small-size mirror used to measure the surface profile of the mirror segment.

Referring to FIG. 4A, the small mirrors 7 can be made by conventional optical fabrication techniques. For example, a large radius 21 is polished on one surface of the mirror 7, and then machined back to leave an annular, castellated, ring 22 that contacts the test object 5 with a thin layer of UV setting cement 23. The desired radius of curvature of the reflecting surface 26 is polished on the other surface with a wedge angle calculated for the specific position in the system aperture. Various other mirror manufacturing techniques (e.g., milling and single point diamond turning) and attachment methods (e.g., magnetic preload or spring preload) can also be used.

Figure 4B:
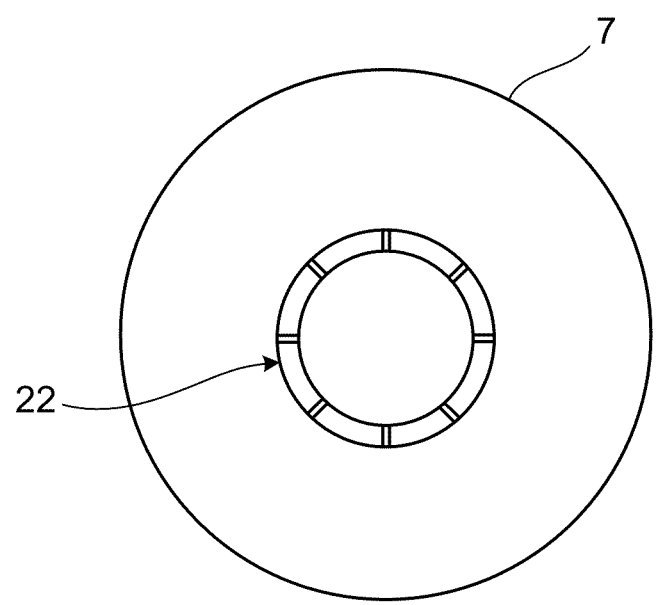

FIG. 4B shows the mirror 7 with a circular aperture. In some examples, other aperture shapes can be chosen. For example, hexagonal apertures can be used to increase (e.g., maximize) the reflecting surface size and maximize sensitivity to tilt for a given interferometer. For any given test object 5 and mount 6 design, the number, positions, sizes, and aperture shapes of the mirrors can be evaluated with respect to factors such as required measurement sensitivity, cost, mass added to the test object 5, change in stiffness of the test object element 5, tilt stiffness of the mirror mount, etc.

In the examples above, a primary mirror segment having a large radius is effectively converted to a segmented surface of shorter radius which may be more convenient to test. It is also possible to synthesize a longer radius.

A number of implementations have been described. Nevertheless, it will be understood that various modifications may be made without departing from the spirit and scope of the invention. Any of the methods described above can be implemented, for example, in computer hardware, software, or a combination of both. The methods can be implemented in computer programs using standard programming techniques following the descriptions herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., RAM, ROM, Flash memory, optical disc, or magnetic disk) readable by a general or special purpose programmable computer, for configuring and operating the computer when the storage media or device is read by the computer to perform the procedures described herein. The computer program can also reside in cache or main memory during program execution. The method can also be implemented as a computer-readable storage medium, configured with a computer program, where the storage medium so configured causes a computer to operate in a specific and predefined manner to perform the functions described herein.

Other aspects, features, and advantages are within the scope of the invention. For example, in some implementations, the fold mirror 3 and the assembly of the test object 5 and the mount 6 are rotated about an axis out of the plane of FIG. 3, orthogonal to the axis 4 and intersecting the axis 4 at the surface of the fold mirror 3.

In some implementations, the fold mirror 3 is removed, and the interferometer 1 and the transmission sphere 2 are aligned along the optical axis of the test object 5.

In some implementations, the fold mirror 3 is replaced with alternate beam steering optics, such as prisms, gratings, and spatial light modulators, etc.

In some implementations, the fold mirror 3 is replaced with beam splitting optical elements that provide discrete, rather than adjustable, test angles.

In some implementations, the mirrors 7 are replaced with reflection holograms. This may have the advantage of reducing weight because the reflection holograms can be made with thin substrates compared to the glass mirrors 7. The holograms has diffraction gratings designed to shape the reflected wavefront in a way that generate the desired fringe pattern in the interferometer (e.g., nulled fringes or carrier fringes). The exact shape of the grating lines can be calculated mathematically, and an e-beam writing or laser plotting process, for example, can be used to fabricate the diffraction gratings.

Figure 5A:
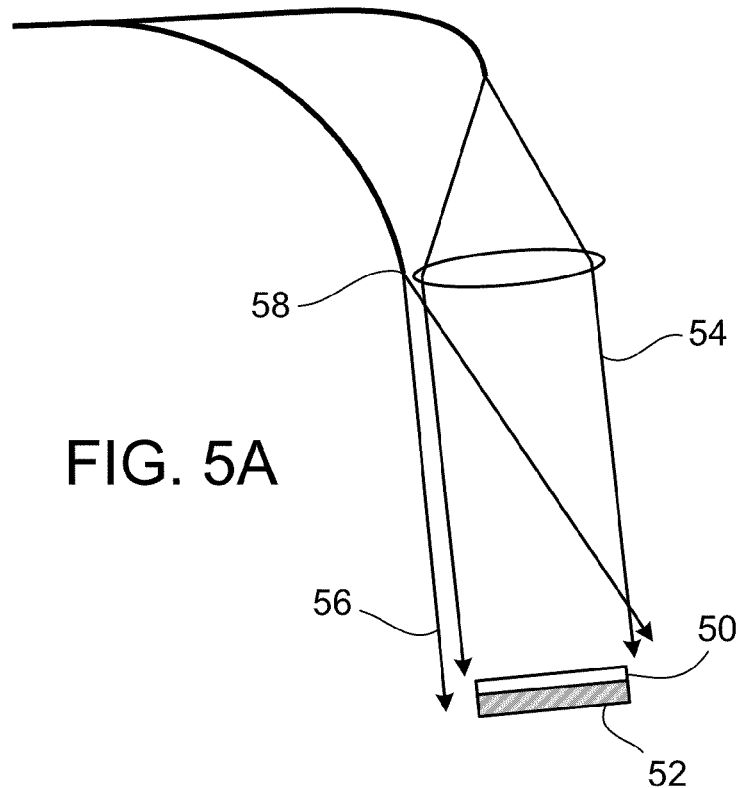
FIG. 5A is a diagram illustrating a way to generate a reflective hologram having diffraction gratings using interference lithography.

FIG. 5A illustrates a way to generate the diffraction gratings using interference lithography. A photoresist layer 50 is coated on a mirror substrate 52 and exposed with a two-beam interference pattern. The first beam is a collimated beam 54 directed orthogonally at the surface of the mirror substrate 52 and the second beam is a diverging beam 56 emerging from a point source 58 oriented with respect to the substrate 52 the same way as the interferometer focus will be in the interferometer setup. For different reflection holograms placed at different locations on the surface of the test object 5, the holograms will have different patterns that are configured to reflect light along different directions back toward the interferometer focus.

The photoresist exposure system uses a wavelength (e.g., $\lambda/2$) that is, for example, half the wavelength (e.g., $\lambda$) used in the interferometer. After development of the photoresist into a hologram 60 having diffraction gratings (FIG. 5B), the spatial frequencies of the gratings are such that, when placed in the interferometer, the hologram (in the first diffraction order) will turn the interferometer's spherical test wave into its phase conjugate, a spherical wave propagating in the opposite direction, back to the transmission sphere's focus.

Figure 5B:
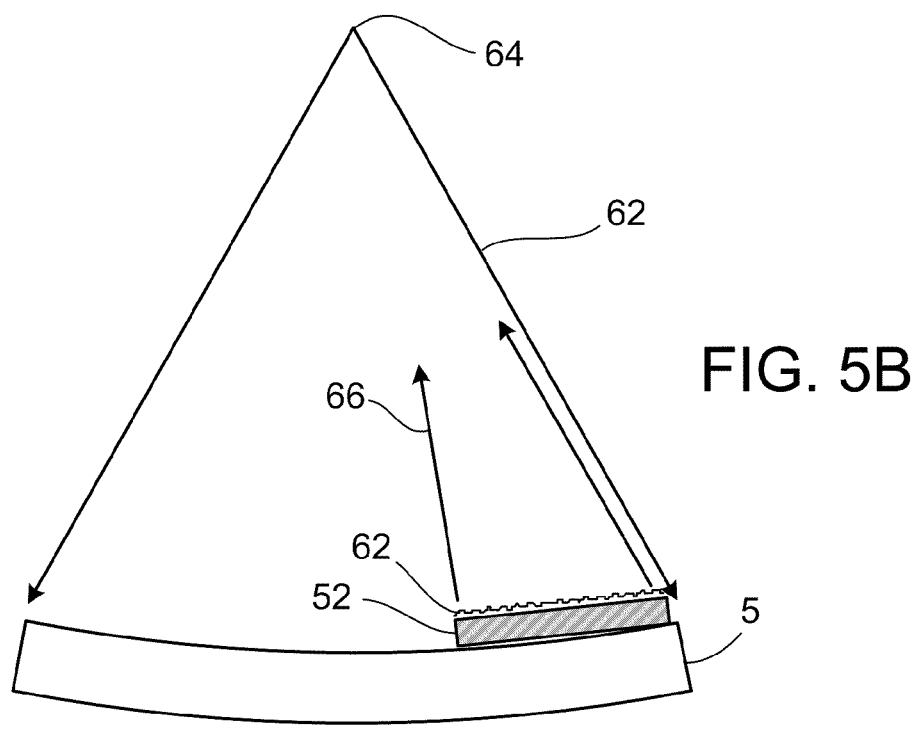
FIG. 5B is a diagram of an example setup for testing a mirror segment using the reflective hologram.

Referring to FIG. 5B, the mirror substrate 52 and the reflection hologram 60 are placed on the surface of the test object 5. Spherical waves 62 emanating from a focus point 64 are directed toward the surface of the test object 5. The hologram 60 reflects the light waves to generated reflected light waves 66 that propagate and converge substantially toward the focus point 64. The reflected light waves 66 propagate toward the interferometer 1 and interfere with waves reflected from a reference surface. The interference patterns are used to determine deformations in the test object 5. In some implementations, the Fizeau interferometer 1 is replaced with a Twyman-Green, LUPI (laser unequal path interferometer), Michelson, or point diffraction interferometer.

In some implementations, interferometric data acquisition may be via carrier fringe techniques, mechanical phase shifting, wavelength shifting, or Fourier Transform Phase Shifting Interferometry. Other interferometer configurations with other reference surfaces, holograms, etc., can also be used.

In some implementations, the transmission sphere 2 can be rotated to ensure consistent mapping of the small mirrors 7 to the same point of the transmission sphere reference surface.

In some implementations, reference surface calibration is integrated, for example via ball averaging, as disclosed in U.S. Pat. No. 6,816,267, herein incorporated by reference.

In some implementations, a Shack-Hartman sensor is used instead of the Fizeau interferometer. Other slope sensitive sensors can also be used.

In some implementations, the mirror tilts are measured sequentially using a small aperture slope sensor (i.e., the tilt of one mirror 7 is measured, followed by measurement of the tilt of another mirror 7, etc.). In such implementations, a test beam can be steered from small mirror to small mirror by a system of scanning polygons, galvo mirrors, or other methods. The final measurement uncertainty in this implementation is affected by the accuracy of the scanner.

In some implementations, the spherical mirrors are replaced with tilted flat mirrors or linear gratings. When flat mirrors are used, each of the flat mirrors is tilted to reflect a portion of the light toward the focus. When linear gratings are used, the period of each of the gratings is chosen so that a portion of the light can be reflected toward the focus. The substrate for the linear gratings does not need to be tilted and can be mounted roughly parallel to the surface of the test object (e.g., a larger mirror). The potential benefits of this setup include reduced weight and cost (as compared to using spherical mirrors). In such implementations, the wavefront curvature of the illumination beams are not inverted by the flat mirrors or linear gratings. Therefore, the detection of tilt may involve finding shifts in the position of the centroid of circular fringe patterns (for interferometric sensors) or the use of collimated small beams and a Hartman sensor or other position sensitive device.

When a set of linear gratings is designed to be placed at a certain location on the surface of the test object, but the period of the gratings is not entirely correct such that light is not directed toward the interferometer focus, the position and orientation of the linear gratings can be adjusted until circular fringes are detected at the interferometer 1.

In some implementations, the small mirrors 7 are mounted in a frame that allows preloading the mirrors 7 against the surface of the test object 5, allows a certain degree of motion normal to the test object surface, allows a certain degree of tip or tilt, and provides separate measurement of the deformation of the frame as it rotates between measurement positions.

In some implementations, the methods described above can be used to measure deformations of a reference plate that carries an array of non-contact sensors that measure the shape of a test object.

What is claimed is:

1. A method of measuring deformations of a surface of a test object, the method comprising:
    attaching mirrors to a surface of a test object, each mirror having a reflective surface with a dimension and a radius of curvature smaller than those of the surface of the test object;
    directing light towards the mirrors and a reference surface;
    generating interference patterns using light reflected from the mirrors and the reference surface; and
    determining changes in the surface of the test object based on the interference patterns.

2. The method of claim 1, comprising estimating deformations of the test object, and determining locations for placement of the mirrors based on the estimated deformations.

3. The method of claim 2, comprising placing the mirrors at locations where there are estimated changes in the slope of the surface of the test object.

4. The method of claim 3 in which placing the mirrors comprises placing the mirrors at locations of maximum estimated slope change.

5. The method of claim 2 in which estimating deformations of the test object comprises using finite element analysis to estimate the deformations due to gravity in response to a change in an orientation of the test object.

6. The method of claim 1 in which determining changes in the surface of the test object comprises determining changes in the surface of the test object in response to changes in one or more conditions associated with the test object.

7. The method of claim 6 in which the one or more conditions comprise at least one of an orientation of the test object or a temperature of the test object.

8. The method of claim 1 in which generating the interference patterns comprises using light reflected from all the mirrors simultaneously to generate the interference patterns.

9. The method of claim 1 in which generating the interference patterns comprises sequentially detecting light reflected from various mirrors to generate the interference patterns.

10. The method of claim 1, comprising determining a first radius of curvature for the surface of a first mirror, and determining a second radius of curvature for the surface of a second mirror based on the first radius of curvature and an offset.

11. The method of claim 10, comprising determining the offset based on a distance between the first and second mirrors and a radius of curvature of the surface of the test object.

12. The method of claim 10 in which determining the first radius of curvature comprises determining the first radius of curvature based on a size of the surface of the test object and a numerical aperture of an optical system that directs light toward the mirrors.

13. The method of claim 1 in which the test object has a parabolic surface, and the method comprises determining a first radius of curvature for the surface of a first mirror positioned at or near an optical axis of the test object, and determining a second radius of curvature for the surface of a second mirror based on the first radius of curvature and an offset, the offset being determined using parabolic approximation.

14. The method of claim 1 in which the test object comprises a piece of glass and a mount for supporting the glass.

15. The method of claim 1 in which the test object comprises a primary mirror segment of a telescope.

16. The method of claim 1 in which the surface of the test object is reflective.

17. A method of measuring a surface of a test object, the method comprising:
attaching mirrors to a surface of a test object, each mirror having a reflective surface with a dimension and a radius of curvature smaller than those of the surface of the test object; and
determining changes in the surface of the test object using light reflected from the mirrors.

18. The method of claim 17 in which determining changes in the surface of the test object comprises determining changes in the surface of the test object in response to changes in one or more conditions associated with the test object.

19. The method of claim 18 in which the one or more conditions comprise at least one of an orientation of the test object or a temperature of the test object.

20. The method of claim 17 in which determining changes in the surface of the test object comprises determining changes in the surface of the test object based on interference patterns generated from light reflected from the mirrors and light reflected from a reference surface.

21. The method of claim 17 in which the surface of the test object is reflective.

22. A method of measuring a primary mirror segment of a telescope, the method comprising:
attaching small mirrors to a surface of a primary mirror segment of a telescope, each small mirror having a reflective surface having a dimension and a radius of curvature smaller than those of the surface of the primary mirror segment;
positioning the primary mirror segment at a first orientation and generating a first interference pattern based on light reflected from the small mirrors;
positioning the primary mirror segment at a second orientation and generating a second interference pattern based on light reflected from the small mirrors; and
measuring changes in the surface of the primary mirror segment based on the first and second interference patterns.

23. The method of claim 22 in which when the primary mirror segment is in the first orientation, the optical axis of the primary mirror segment is substantially aligned with a vertical direction, and when the primary mirror segment is in the second orientation, the optical axis of the primary mirror segment is at an angle with respect to the vertical direction.

24. The method of claim 22 in which the surface of the primary mirror segment has a radius of curvature greater than ten times that of the small mirrors.

25. A method of measuring a surface of a test object, the method comprising:
attaching a first mirror to a surface of a test object, the first mirror having a reflective surface with a dimension that is smaller than that of the surface of the test object, the first mirror having a radius of curvature smaller than that of the surface of the test object; and
detecting changes in a shape of the test object when the test object changes from a first orientation to a second orientation, the detecting being based on a first interference pattern and a second interference pattern, the first interference pattern being generated partly from light reflected from the first mirror when the test object is at the first orientation, the second interference pattern being generated partly from light reflected from the first mirror when the test object is at the second orientation.

26. The method of claim 25, comprising reflecting a first portion of light emitted by a light source from a reference surface, reflecting a second portion of the light from the first mirror, and generating the first or second interference pattern based on an interference between the first portion of the light reflected from the reference surface and the second portion of the light reflected from the first mirror.

27. The method of claim 25, comprising using a detector to detect the first and second interference patterns, the detector being placed at an effective distance to the surface of the test object, the effective distance being smaller than the radius of curvature of the surface of the test object.

28. The method of claim 25, comprising placing a detector at an effective distance to the surface of the test object to detect the first and second interference patterns, the effective distance being smaller than half the radius of curvature of the surface of the test object.

29. The method of claim 25 in which the radius of curvature of the first mirror is less than half the radius of curvature of the surface of the test object.

30. The method of claim 25 in which the radius of curvature of the first mirror is less than 10% of the radius of curvature of the surface of the test object.

31. The method of claim 25, comprising attaching a second mirror to the surface of the test object, the second mirror being spaced apart from the first mirror, the second mirror having a reflective surface with a dimension that is smaller than that of the surface of the test object, the second mirror having a radius of curvature smaller than that of the surface of the test object.

32. The method of claim 31 in which the first interference pattern is generated partly from light simultaneously reflected from the first and second mirrors.

33. The method of claim 25 in which the test object comprises a piece of glass and a mount for supporting the glass.

34. The method of claim 25 in which the surface of the test object is reflective.

35. A method of measuring deformations of a surface of a test object, the method comprising:
attaching reflective devices to a curved surface of a test object, each reflective device having a reflective region having an area smaller than the area of the surface of the test object;
directing light towards the reflective devices and a reference surface;
reflecting at least portions of the light from the reflective devices such that the reflected light substantially converge toward a focus point, the distance between the focus point and the surface of the test object being smaller than a radius of curvature of the test object;
generating interference patterns using light reflected from the reflective devices and light reflected from the reference surface; and
determining changes in the surface of the test object based on the interference patterns.

36. The method of claim 35 in which the reflective devices comprise at least one of a flat mirror, a concave mirror, linear gratings, or a reflection hologram comprising diffraction gratings.

37. The method of claim 35, comprising estimating deformations of the test object, and determining locations for placement of the reflective devices based on the estimated deformations.

38. The method of claim 37, comprising placing the reflective devices at locations where there are maximum estimated changes in the slope of the surface of the test object.

39. The method of claim 35 in which the test object comprises a primary mirror segment of a telescope.

40. The method of claim 35 in which the reflective devices comprise reflection holograms having diffraction gratings, and the method comprises using interference lithography to fabricate the diffraction gratings.

* * * * *